United States Patent
Fein et al.

(10) Patent No.: US 8,195,682 B2
(45) Date of Patent: Jun. 5, 2012

(54) TOPOGRAPHICAL ANALYSIS SYSTEM

(75) Inventors: Gene Fein, Malibu, CA (US); Edward Merritt, Lenox, MA (US)

(73) Assignee: Empire Technology Development LLC., Wilmington, DE (US)

( * ) Notice: Subject to any disclaimer, the term of this patent is extended or adjusted under 35 U.S.C. 154(b) by 397 days.

(21) Appl. No.: 12/201,329

(22) Filed: Aug. 29, 2008

(65) Prior Publication Data

US 2010/0057683 A1   Mar. 4, 2010

(51) Int. Cl.
   *G06F 7/00*   (2006.01)
(52) U.S. Cl. ........ 707/764; 707/705; 707/758; 707/706; 709/203; 705/7.11
(58) Field of Classification Search .................. 707/705, 707/706, 758, 764; 705/7
   See application file for complete search history.

(56) References Cited

U.S. PATENT DOCUMENTS

| | | | |
|---|---|---|---|
| 2004/0043760 A1* | 3/2004 | Rosenfeld et al. | 455/414.3 |
| 2005/0192752 A1* | 9/2005 | Rooney et al. | 702/5 |
| 2006/0294062 A1* | 12/2006 | Folchetti et al. | 707/3 |
| 2009/0094077 A1* | 4/2009 | Fosburgh et al. | 705/7 |

* cited by examiner

*Primary Examiner* — Wilson Lee
*Assistant Examiner* — Tuan-Khanh Phan
(74) *Attorney, Agent, or Firm* — Woodcock Washburn LLP (57) ABSTRACT

A topographical analysis system that provides an integrated approach for gathering available topographical data and synthesizing the topographical data for various uses by various users. The topographical data may be real time data, historical data, and/or most recent data. The processing of the data utilizes cloud resources in a cloud computing architecture. In addition, cloud resources are utilized to store various accumulated topographical data in a manner such that the cloud resources can quickly process calculations and return results to an end user requesting certain data.

20 Claims, 6 Drawing Sheets

600 A COMPUTER PROGRAM PRODUCT

602 COMPUTER STORAGE MEDIA HAVING COMPUTER-EXECUTABLE INSTRUCTIONS

610 RECEIVING QUERY FROM USER DEVICE

612 OBTAINING DATA POINTS APPLICABLE TO QUERY

614 PROVIDING DATA POINTS TO CLOUD RESOURCES FOR SYNTHESIZING

616 SENDING RESPONSE TO USER DEVICE

604 A RECORDABLE MEDIUM

606 A COMPUTER-IMPLEMENTED METHOD

*Fig. 6*

TOPOGRAPHICAL ANALYSIS SYSTEM

BACKGROUND

Topographical analysis uses information from various diverse sources. For example, one of the sources may be from physical inspection, such as for determining soil type and the like. Other topographical data may be obtained from satellite imaging and other visual data sources. Once the information is obtained from these sources, the information may be stored for use by special software to address the needs of a specific organization. This manner of topographical analysis has been the norm for many years.

SUMMARY

Described herein, among other things, are implementations for a topographical analysis system that provides an integrated approach for gathering available topographical data and synthesizing the topographical data for various uses by various users. The topographical data may be real time data, historical data, and/or most recent data. The processing of the data uses cloud resources in a cloud computing architecture. In addition, cloud resources are used to store various accumulated topographical data in a manner such that the cloud resources can quickly process calculations and return results to an end user requesting certain data.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings in which:

Embodiments of the present topographical analysis system and technique will now be described in detail with reference to these Figures in which like numerals refer to like elements throughout.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

This disclosure is drawn, intera/alia, to methods, apparatus, computer programs and systems related to topographical analysis systems.

Figure 1:
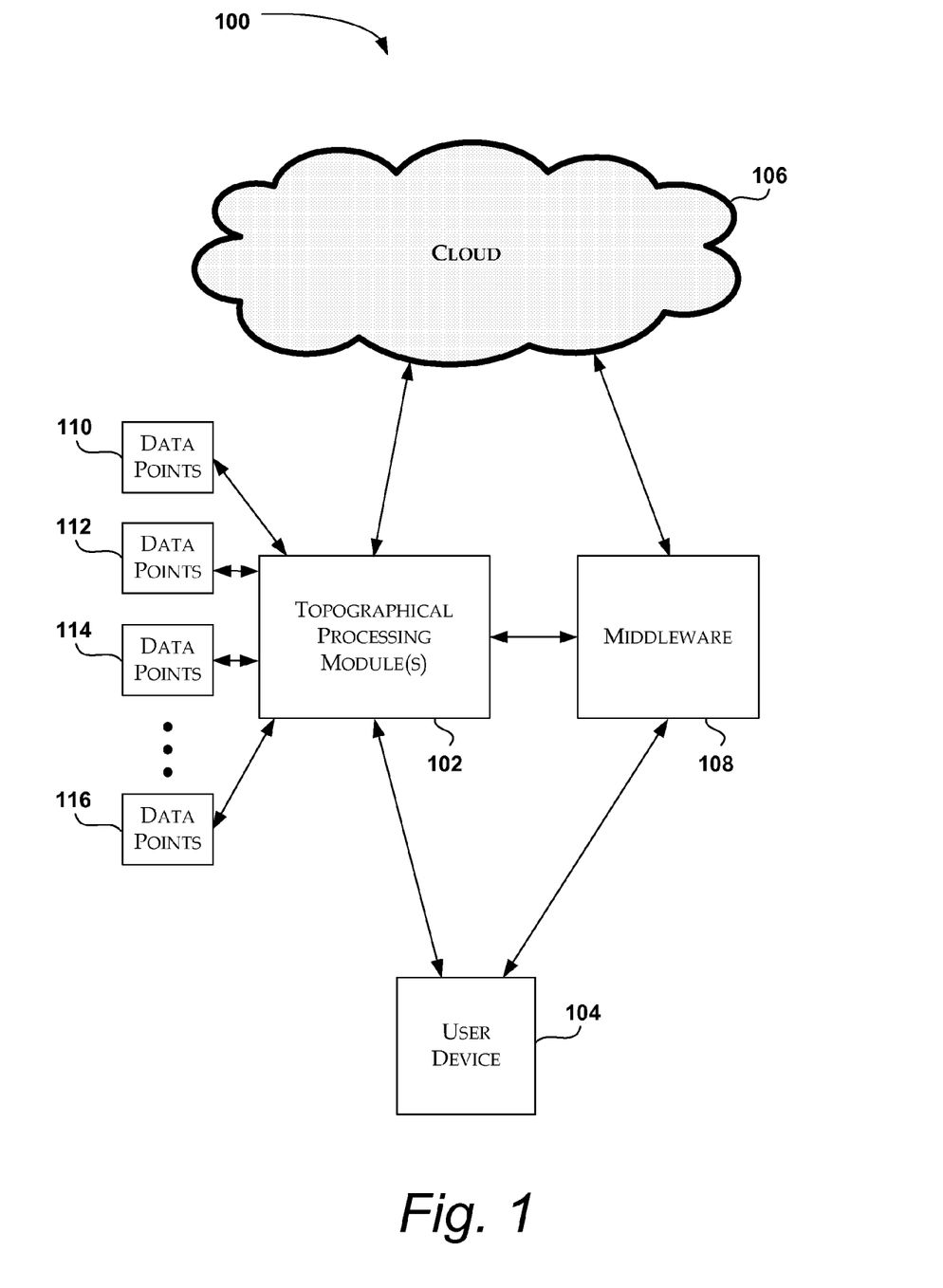
FIG. 1 is a functional block diagram generally illustrating components of a topographical analysis system.

FIG. 1 is a functional block diagram generally illustrating components of a topographical analysis system 100. The topographical analysis system includes one or more topographical processing modules 102. The topographical processing modules communicate with a cloud 106 that provides distributed parallel computing functionality. In addition, the topographical processing modules 102 may communicate with a user device 104. The topographical analysis system may also include middleware 108 for managing processing within cloud 106 and interacting with user device 104. Topographical processing modules 102 and middleware 108 may communicate with each other.

Figure 3:
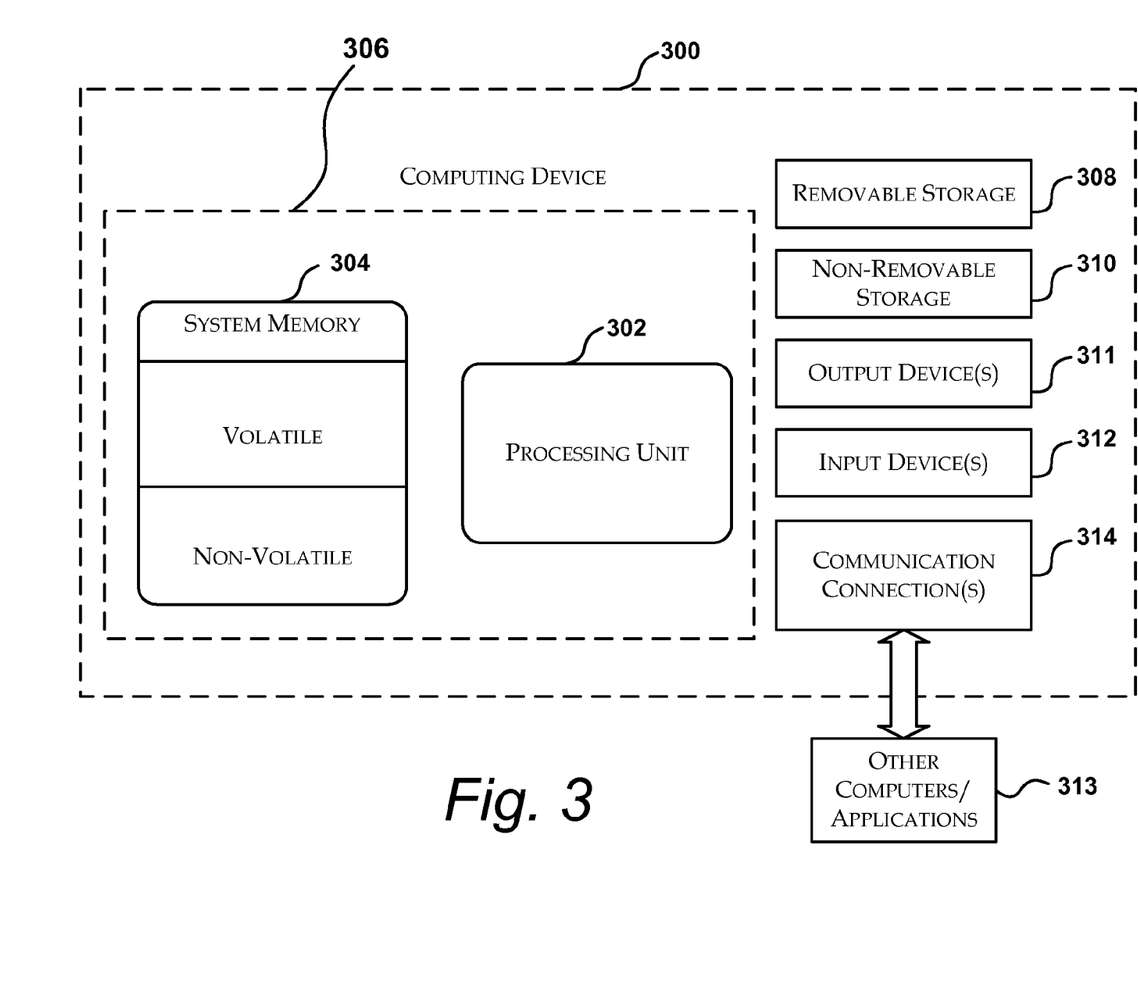
FIG. 3 is a functional block diagram of an exemplary computing device that may be used to implement one or more embodiments of the topographical processing modules shown in FIG. 1.

In overview, cloud 106 may include several computing devices that work simultaneously to act as a single unit. Tasks are automatically distributed among the several computing devices. One embodiment of a computing device is illustrated in FIG. 3 and described below. Cloud 106 provides a convenient and inexpensive way to add additional processing capabilities. Because the cost of computing devices have dropped, low cost computing devices may be added to the cloud to provide additional processing capabilities instead of purchasing a more expensive higher end computing device with increased processing capabilities to replace a computing device with insufficient processing capabilities. Therefore, the cloud, with all its computing power, can perform intensive tasks efficiently and cost-effectively. Results from the processing are transferred to a user device 104 for presentation. The cloud may utilize one of many different cloud computing architectures. In one embodiment, the cloud computing architecture includes a massive network of "cloud servers" interconnected as if in a grid running in parallel. The cloud servers can be any variation of a computing device, one example of which is described below with reference to FIG. 3. In general, the cloud servers provide parallel processing capabilities, archival capabilities, and storage capabilities. One exemplary cloud computing architecture is described in conjunction with FIG. 4 below.

Middleware 108 includes software components that interact with the cloud servers. For example, middleware 108 may include components that provide authentication, data transfer, response handling, and the like. Middleware 108 may be configured to provide results to a user device after analysis by resources in the cloud. Examples of components of an exemplary middleware architecture are described in conjunction with FIG. 5 below.

User device 104 includes dumb terminals, laptop computers, desktop computers, mobile devices, hand-held devices, and the like. Because the cloud performs the intense processing, it is not necessary for user device 104 to have substantial processing power or memory. Therefore, typically, user device 104 is configured with minimal processing power and memory to help conserve battery life. FIG. 3 illustrates basic components of a computing device that may be utilized as user device 104.

Topographical analysis system 100 includes one or more topographical processing modules 102. While the topographical processing modules 102 are shown within a box in FIG. 1, one skilled in the art will appreciate that the processing modules 102 may be distributed over multiple computing devices and may execute portions on multiple computing devices. In addition, one or more topographical processing modules 102 or a portion of a topographical processing module may execute within cloud 106, user device 104, and/or as middleware 108. The topographical processing modules 102 handle user queries, organize data for the queries, handle access to data in storage, and the like.

Topographical analysis system 100 also includes one or more data points, such as data points 110-116. Each data point represents a source of data applicable for processing within the topographical analysis system. For example, data point 110 may include any publicly registered data from land use planning, conservation commissions, a registry of deeds, and other municipal institutions. Data point 112 may include topographical data such as surveys, percolation tests, and/or soil tests. Data point 114 may include topographical conditions obtained via satellite imagery and/or other video resources. Data point 116 may include live data received from operations such as surveying. These and other types of topographical information are envisioned as data points in the topographical analysis system. The data points may be available on a real-time basis, stored in a cloud storage system, and/or updated when requested. The source for each data point may push the data associated with the data point on a pre-determined interval of time or may wait for a request to update the data. Historical data for each data point may be stored in the cloud storage system using database techniques.

Figure 2:
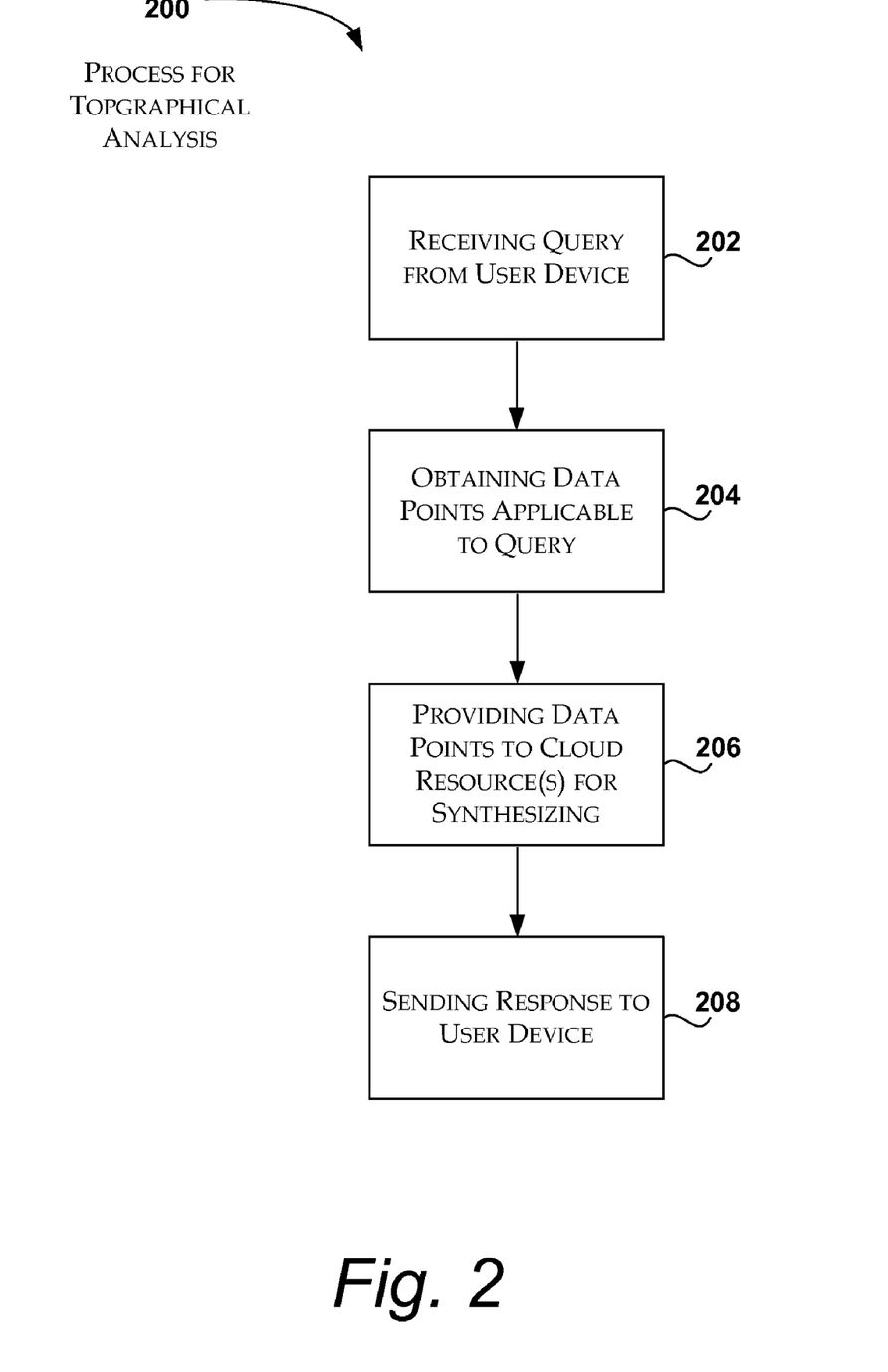
FIG. 2 is a flow diagram illustrating a process for topographical analysis.

FIG. 2 is a flow diagram illustrating a process for topographical analysis. In FIG. 2, and in the following figures that include various illustrative embodiments of operational flows, discussion and explanation may be provided with respect to apparatus and methods described herein, and/or with respect to other examples and contexts. The operational flows may also be executed in a variety of other contexts and environments, and or in modified versions of those described herein. In addition, although some of the operational flows are presented in sequence, the various operations may be performed in various repetitions, concurrently, and/or in other orders than those that are illustrated. At operation 202, a query is received from a user device. The query may request data points related to land ownership, value, real estate listings, elevations, permits, rulings, soil tests, and other information applicable to a specified location. A user may enter the specified location on the user device. In another embodiment, the user device may include a GPS module that automatically determines the specified location. The specified location is then transmitted with the query. The query is sent wirelessly using conventional wireless communication techniques, such as cellular phone communication techniques.

At operation 204, data points applicable to the query are obtained. The data points may be obtained as real time data from one or more data sources. In another embodiment, one or more of the data points may be retrieved from a data storage unit residing within the cloud. Stored data points, along with real time data, may be used to display chronological visual changes to a topographical area over time. For example, cliffs of the National Seashore at Truro, Mass., the Sphinx in Egypt, and shifting sands around islands can be measured and compared in a time-lapse display. The data points may be retrieved based on a street address, satellite, or GPS positioning data, or the like.

At operation 206, the data points are sent to cloud resources for synthesizing based on the query. The data points are weighed subject to specific rules applicable to the query. The processing may generate past, present, and/or future topographical modeling scenarios. For example, a layout for a planned development may be determined based on several data points, which may include county and city regulations and codes. Because cloud resources provide the computational power, intense calculations may be performed in an expeditious manner.

At operation 208, a response is sent to the user device. The response may be packaged based on the type of user device that requested the query. This allows the response to be packaged in a manner that is compatible with the user device interface. The response includes answers to the query based upon the available data points. The response may include a warning if it is determined that the data points indicate that guidelines from local, regional, or national organizations were not met. For example, a warning may be sent if a user suggests building a 4800 square foot home on a parcel of land that would not support that large of a home due to soil conditions, height restrictions, or the like. The warning may appear as color-coded line/text that the user may click to get the rational for the warning.

The system described above may be used in several areas. For example, construction, planning, and conservation organizations may use the present topographical system to provide reports for local, regional, national, and global individuals, businesses, and governments. Data points available from builders, designers, and developers may be used to automatically site structures and/or manipulate the topography of a site based upon regulations and constraints applicable to the site. The system may be used to determine erosion at different locations and predict future erosion at that location.

The processes described above may be implemented using computer-executable instructions in software or firmware, but may also be implemented in other ways, such as with programmable logic, electronic circuitry, or the like. In some alternative embodiments, certain of the operations may even be performed with limited human intervention. Moreover, the process is not to be interpreted as exclusive of other embodiments, but rather is provided as illustrative only.

FIG. 3 is a functional operation diagram of an exemplary computing device 300 that may be used to implement portions of the topographical analysis system. The exemplary computing device 300 may be a dumb terminal, a mobile device, a laptop device, a desktop device, a server, and other devices. For example, cloud 106 includes several computing devices that provide parallel computing. The topographical processing modules may execute on one or more computing devices as computer-executable instructions. The computing device 300, in one basic configuration, includes at least a processing unit 302 and memory 304. Depending on the exact configuration and type of computing device, memory 304 may be volatile (such as RAM), non-volatile (such as ROM, flash memory, etc.), or some combination of the two. This basic configuration is illustrated in FIG. 3 by dashed line 306.

Additionally, device 300 may also have other features and functionality. For example, device 300 may also include additional storage (removable and/or non-removable) including, but not limited to, magnetic or optical disks or tape. Such additional storage is illustrated in FIG. 3 by removable storage 308 and non-removable storage 310. Computer storage media includes volatile and nonvolatile, removable and non-removable media implemented in any method or technology for storage of information such as computer readable instructions, data structures, program modules or other data. Memory 304, removable storage 308, and non-removable storage 310 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 300. Any such computer storage media may be part of device 300.

Computing device 300 includes one or more communication connections 314 that allow computing device 300 to communicate with one or more computers and/or applications 313. Device 300 may also have input device(s) 312 such as keyboard, mouse, pen, voice input device, touch input device, etc. Output device(s) 311 such as a monitor, speakers, printer, PDA, mobile phone, and other types of digital display devices may also be included. These devices are well known in the art and need not be discussed at length here.

Figure 4:
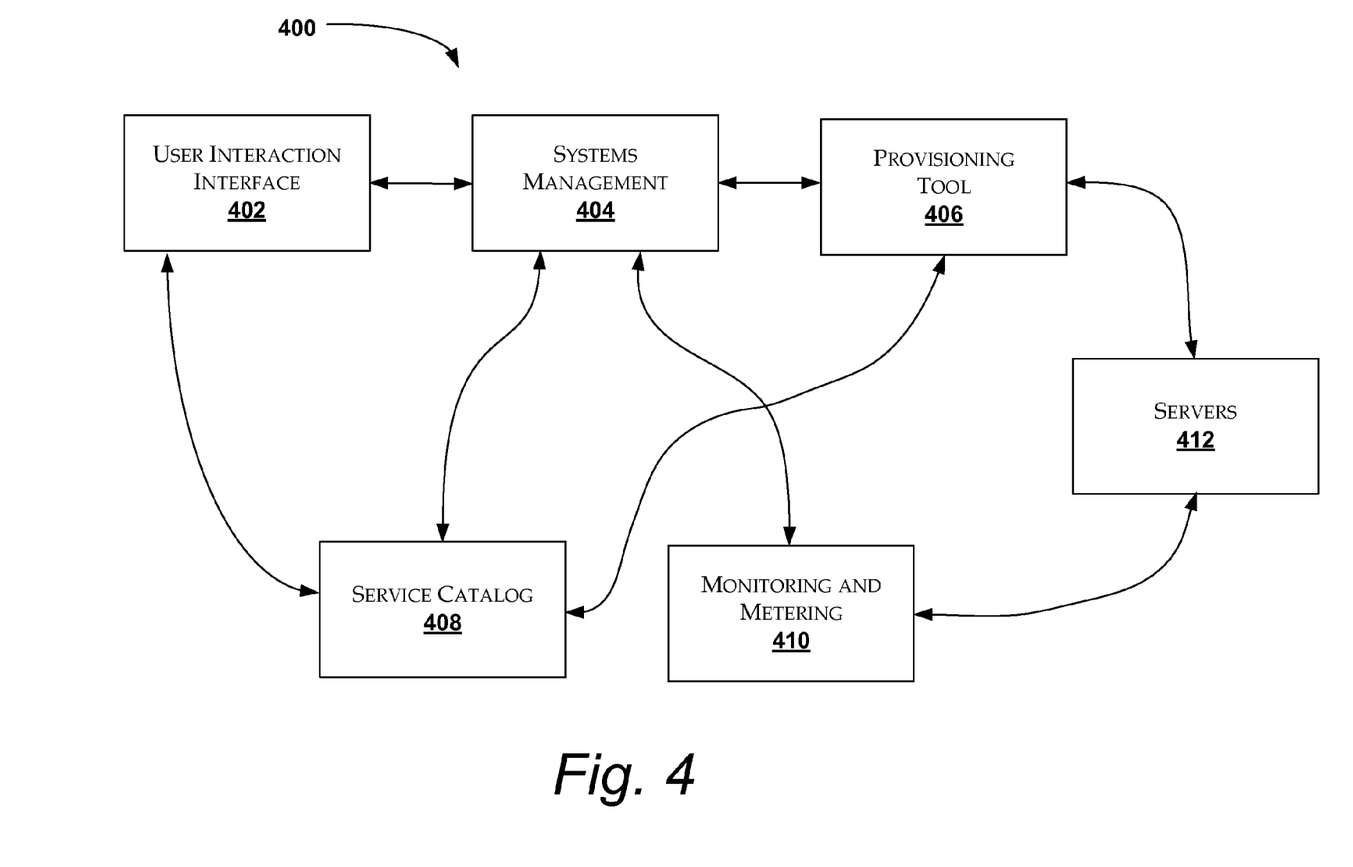
FIG. 4 is an exemplary cloud computing architecture suitable for use in the topographical analysis system shown in FIG. 1.

FIG. 4 is an exemplary cloud computing architecture 400 suitable for use in the topographical analysis system shown in FIG. 1. Exemplary cloud computing architecture 400 may include a user interaction interface 402, a systems management component 404, a provisioning tool 406, a service catalog 408, a monitoring and metering component 410, and servers 412. Servers 412 may include one or more servers and/or one or more virtual servers. The user interaction interface 402 may interact with the system management component 404 and the service catalog 408. The systems management component 404 may interact with the user interaction interface 402, the service catalog 408, the monitoring and metering component 410, and the provisioning tool 406. The provisioning tool 406 may interact with the system management component 404, the service catalog 408, and the servers 412. The servers 412 may interact with the provisioning tool 406 and the monitoring and metering components 410. The monitoring and metering component 410 may interact with the systems management component 404 and servers 412. The service catalog 408 may interact with the user interaction interface 402, the systems management component 404, and the provisioning tool 406.

The user interaction interface 402 allows a user to select a service from the service catalog 408. The request gets passed to the system management component 404 to find the correct resources. The system management component 404 then calls the provisioning tool 406 to carve out resources in the cloud. The provisioning tool 406 may deploy the requested stack or web application as well. The monitoring and metering component 410 may optionally track the usage of the cloud so that used resources may be attributed to a certain user.

Figure 5:
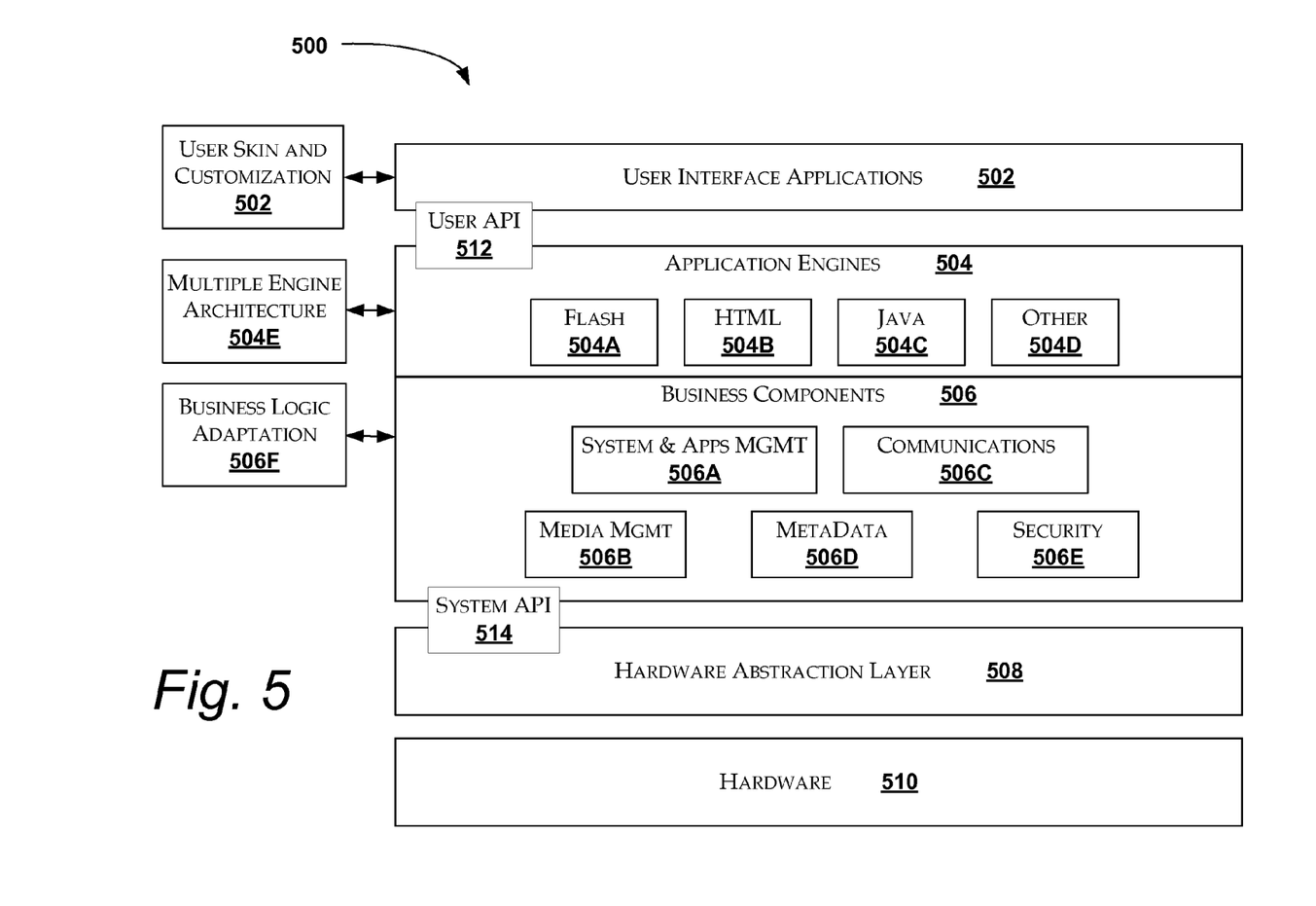
FIG. 5 is an exemplary middleware architecture suitable for use in the topographical analysis system shown in FIG. 1.

FIG. 5 is an exemplary middleware architecture 500 suitable for use in the topographical analysis system shown in FIG. 1. Exemplary middleware architecture 500 may include components such as user interface application 502, application engines 504, business components 506, a hardware abstraction layer 508, and hardware 510. The user interface application 502 may include user interface skin and other customization 502A. A user application programming interface (API) 512 may link the user interface applications 502 with the application engines 504. The application engines 504 may include multiple engine architectures, such as Flash 504A, HTML 504B, Java 504C, or other languages 504D.

The business components 506 may include system and applications management 506A, media management 506B, communications 506C, metadata 506D, and security 506E and may incorporate business logic adaptation 506F. A system application programming interface (API) 514 may link the business components 506 with the hardware abstraction layer 508.

Figure 6:
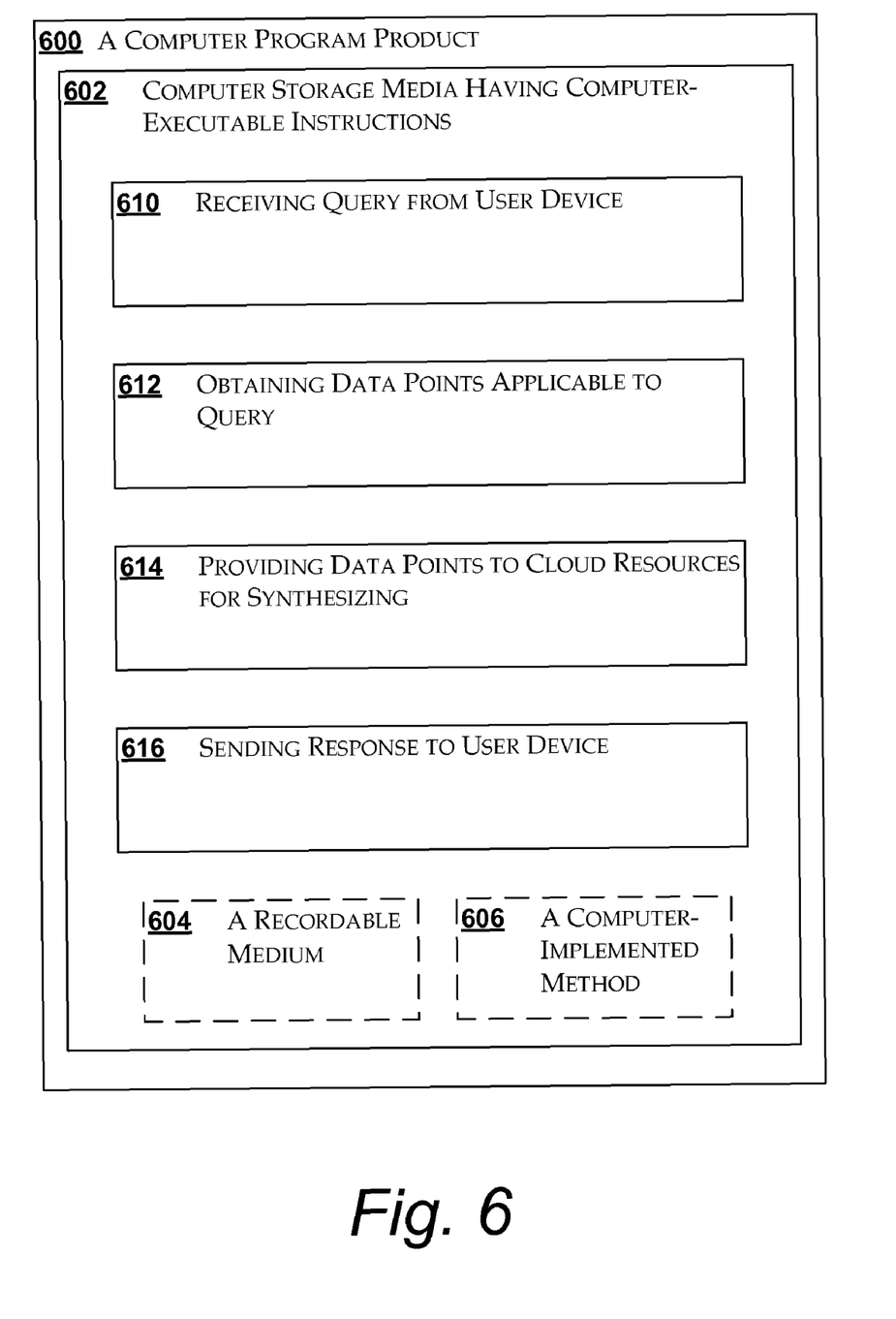
FIG. 6 is a diagram generally illustrating a computer product configured to perform processing by the topographical analysis system shown in FIG. 1.

FIG. 6 is a diagram generally illustrating a computer product 600 configured to perform processing for the topographical analysis system shown in FIG. 1. The computer program product 600 may be one of several forms, such as a computer storage media having computer-executable instructions 602, a recordable medium 604, a computer-implemented method 606, or the like. When the computer-executable instructions are executed, a method is performed. The method includes receiving 610 a query from a user device, obtaining 612 a plurality of data points associated with topographical data applicable to the query, providing 614 the data points to a plurality of cloud resources in the cloud computing architecture for synthesizing based on the query, and sending 616 a response to the user device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various embodiments have been disclosed herein, other aspects and embodiments will be apparent to those skilled in art. The various sports and embodiments disclosed herein are for purposes of illustration and are not intended to be limiting, with the true scope and spirit being indicated by the following claims.

What is claimed is:

1. A computer storage medium having computer-executable instructions for analyzing topographical data, the computer-executable instructions comprising:

instructions to receive a query from a user device, the query comprising an indication of a parcel of land and an indication of a planned development;

instructions to determine a plurality of data points, each data point representing a source of topographical data about the parcel of land;

instructions to obtain topographical data from each of the plurality of data points;

instructions to provide the topographical data from each of the plurality of data points to a plurality of cloud resources in a cloud computing architecture, the plurality of cloud resources providing distributed parallel computing and being configured to work in conjunction with each other to synthesize the topographical data from each of the plurality of data points and produce a result indicative of whether the parcel of land can support the planned development;

instructions to receive the result processed by the plurality of cloud resources; and instructions to send the result to the user device.

2. The computer storage medium recited in claim 1, wherein the query includes a location of the parcel of land.

3. The computer storage medium recited in claim 2, wherein the user device is configured to receive a user input indicating the location.

4. The computer storage medium recited in claim 2, wherein the user device is configured to identify the location using a global positioning module associated with the user device.

5. The computer storage medium recited in claim 2, wherein the plurality of data points include land use and planning data associated with the location.

6. The computer storage medium recited in claim 1, wherein the user device comprises a mobile device.

7. The computer storage medium recited in claim 1, wherein at least one of the plurality of data points is obtained from a real time data source.

8. The computer storage medium recited in claim 1, wherein at least one of the plurality of data points is obtained from a data storage unit operating in the cloud computing architecture.

9. The computer storage medium recited in claim 1, wherein synthesizing the data points comprises comparing a stored value for one of the data points with a real time value for the one data point to provide a time-lapse view of a location associated with the parcel of land.

10. The computer storage medium recited in claim 1, wherein synthesizing comprises generating at least one scenario for situating a building on the parcel of land.

11. The computer storage medium recited in claim 10, wherein at least one of the data points comprises a regulation from a coding authority.

12. A computer-implemented method for analyzing topographical data, comprising:

receiving a query from a user device, the query comprising an indication of a parcel of land and an indication of a planned development;

determining a plurality of data points, each data point representing a source of topographical data about the parcel of land;

obtaining topographical data from each of the plurality of data points;

providing the topographical data from each of the plurality of data points to a plurality of cloud resources in a cloud computing architecture, the plurality of cloud resources providing distributed parallel computing and being configured to work in conjunction with each other to synthesize the topographical data from each of the plurality of data points and produce a result indicative of whether the parcel of land can support the planned development;

receiving the result processed by the plurality of cloud resources; and sending the result to the user device.

13. The computer-implemented method recited in claim 12, wherein the one or more topographical data sources comprise at least one real time data source.

14. The computer-implemented method recited in claim 12, wherein the one or more topographical data sources comprise at least one data storage unit operating in the cloud computing architecture.

15. The computer-implemented method recited in claim 12, wherein the plurality of data points comprise at least one data point from publicly available information and at least another data point from privately held data.

16. The computer-implemented method recited in claim 15, wherein the publicly available information includes information from one or more of the group consisting of a registry of deeds, a planning board, and an environmental impact board, and wherein the privately held data includes information from one or more of the group consisting of a survey, a perc test, and a design plan.

17. The computer-implemented method recited in claim 12, wherein synthesizing comprises generating at least one scenario that situates a building on the parcel of land.

18. The computer-implemented method recited in claim 17, wherein at least one of the data points comprises a regulation from a coding authority.

19. The computer-implemented method recited in claim 12, wherein the user device comprises a mobile device.

20. The computer-implemented method recited in claim 12, wherein the topographical data includes at least one type of data from a set comprising multimedia data, audio data, image data, and documents.

* * * * *

UNITED STATES PATENT AND TRADEMARK OFFICE
CERTIFICATE OF CORRECTION

PATENT NO. : 8,195,682 B2
APPLICATION NO. : 12/201329
DATED : June 5, 2012
INVENTOR(S) : Fein et al.

Page 1 of 1

It is certified that error appears in the above-identified patent and that said Letters Patent is hereby corrected as shown below:

In Fig. 2, Sheet 2 of 6, below Tag "200", in Line 2, delete "TOPGRAPHICAL" and insert -- TOPOGRAPHICAL --, therefor.

In Fig. 5, Sheet 5 of 6, delete "  " and insert --  --, therefor.

In Column 2, Line 17, delete "intera/alia," and insert -- inter alia, --, therefor.

In Column 10, Line 33, in Claim 16, delete "perc" and insert -- percolation --, therefor.

Signed and Sealed this
Twenty-fifth Day of September, 2012

David J. Kappos
*Director of the United States Patent and Trademark Office*